(12) United States Patent
Johnson

(10) Patent No.: US 8,752,883 B2
(45) Date of Patent: Jun. 17, 2014

(54) AUTOMOTIVE VEHICLES WITH FRONT UNDERCARRIAGE PROTECTORS

(75) Inventor: Donnell B. Johnson, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/276,188

(22) Filed: Oct. 18, 2011

(65) Prior Publication Data

US 2013/0093210 A1    Apr. 18, 2013

(51) Int. Cl.
   *B62D 35/02*    (2006.01)

(52) U.S. Cl.
   USPC ........................................ 296/180.1; 180/903

(58) Field of Classification Search
   USPC ............ 293/115, 142–145; 296/180.1–180.5, 296/193.1; 180/903, 68.1, 68.3
   See application file for complete search history.

(56) References Cited

U.S. PATENT DOCUMENTS

| | | | | |
|---|---|---|---|---|
| 2,190,328 A * | 2/1940 | Hans | ............................ | 293/115 |
| 2,210,091 A * | 8/1940 | Marriott | ........................ | 293/115 |
| 2,225,364 A * | 12/1940 | Bagnall | ........................ | 293/115 |
| D148,755 S * | 2/1948 | Bustin | .......................... | D12/171 |
| D148,756 S * | 2/1948 | Bustin | .......................... | D12/171 |
| D152,058 S * | 12/1948 | Bustin | .......................... | D12/171 |
| D157,318 S * | 2/1950 | Bailey | .......................... | D12/171 |
| D159,437 S * | 7/1950 | Phillips | ........................ | D12/171 |
| 2,905,286 A * | 9/1959 | Adams et al. | .................... | 52/667 |
| 3,287,027 A * | 11/1966 | Schuckman | ............... | 280/491.3 |
| 4,214,786 A * | 7/1980 | Morrison | ................... | 296/180.2 |
| 5,139,295 A * | 8/1992 | Escobedo | ...................... | 293/117 |
| 6,224,120 B1 * | 5/2001 | Eipper et al. | ................... | 293/118 |
| 6,290,271 B1 * | 9/2001 | Geisler | ......................... | 293/115 |
| 6,318,773 B2 * | 11/2001 | Storer | ........................... | 293/115 |
| 6,460,907 B2 * | 10/2002 | Usui | ............................. | 293/115 |
| 6,682,111 B1 * | 1/2004 | Houseman et al. | ........... | 293/115 |
| 6,736,434 B2 * | 5/2004 | Anderson et al. | ............ | 293/102 |
| 7,252,312 B1 * | 8/2007 | Shen et al. | ..................... | 293/115 |
| 7,261,346 B1 * | 8/2007 | Kubesh | ......................... | 293/115 |
| 7,290,809 B2 * | 11/2007 | Filip et al. | ...................... | 293/115 |
| 7,354,082 B2 * | 4/2008 | Sakamoto et al. | ............ | 293/115 |
| 7,399,027 B2 * | 7/2008 | Woodhouse et al. | ...... | 296/193.1 |
| 7,520,561 B2 * | 4/2009 | Nakamae et al. | ........ | 296/193.09 |
| 7,887,125 B2 * | 2/2011 | Tazaki et al. | ............... | 296/193.1 |
| 7,950,730 B2 * | 5/2011 | Usoro et al. | ............... | 296/193.1 |
| 8,204,245 B2 * | 6/2012 | Tobin et al. | ..................... | 381/86 |
| 8,292,350 B2 * | 10/2012 | Li et al. | ........................ | 296/180.1 |
| 2004/0135385 A1 * | 7/2004 | Murray et al. | ................ | 293/142 |
| 2005/0167998 A1 * | 8/2005 | Pleet et al. | ..................... | 293/115 |
| 2005/0212310 A1 * | 9/2005 | Viriyapanthu | ................ | 293/102 |
| 2007/0182173 A1 * | 8/2007 | Shen et al. | ..................... | 293/115 |
| 2008/0054677 A1 * | 3/2008 | McGee | ....................... | 296/180.1 |
| 2009/0001736 A1 * | 1/2009 | Makino | ........................ | 293/115 |
| 2009/0072556 A1 * | 3/2009 | Kudelko et al. | ............... | 293/115 |
| 2013/0026783 A1 * | 1/2013 | Kakiuchi et al. | ........... | 296/180.1 |

FOREIGN PATENT DOCUMENTS

| | | |
|---|---|---|
| JP | 11-91642 | * 4/1999 |
| JP | 2008279819 | * 11/2008 |

\* cited by examiner

*Primary Examiner* — Dennis H Pedder
(74) *Attorney, Agent, or Firm* — Ingrassia Fisher & Lorenz, P.C.

(57) ABSTRACT

An automotive vehicle includes a body, a drive system, and a plurality of protrusions. The body has a centerline, an undercarriage, and a front portion. The drive system is disposed within the body. The plurality of protrusions extend from the front portion, and are positioned around the centerline for protection of the undercarriage.

20 Claims, 2 Drawing Sheets

AUTOMOTIVE VEHICLES WITH FRONT UNDERCARRIAGE PROTECTORS

TECHNICAL FIELD

The present disclosure generally relates to the field of automotive vehicles and, more specifically, to automotive vehicles with front undercarriage protectors.

BACKGROUND

Automotive vehicles generally encounter aerodynamic resistance, or drag, as the automotive vehicle is operated. One type of aerodynamic resistance in automotive vehicles occurs when relatively high velocity air travels underneath the automotive vehicle during operation of the automotive vehicle. Such high velocity air may come in contact with an undercarriage of the automotive vehicle, particularly proximate a center portion of the automotive vehicle, which can produce aerodynamic resistance for the automotive vehicle. Certain automotive vehicles include airdams below a front bumper of the automotive vehicle that can help to reduce aerodynamic drag. However, today's automotive vehicles, with or without an airdam, still may not provide optimal protection against aerodynamic drag during operation of the automotive vehicle.

Accordingly, it is desirable to provide automotive vehicles with improved protection against aerodynamic drag. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, an automotive vehicle is provided. The automotive vehicle comprises a body, a drive system, and a plurality of protrusions. The body has a centerline, an undercarriage, and a front portion. The drive system is disposed within the body. The plurality of protrusions extend from the front portion, and are positioned around the centerline for protection of the undercarriage.

In accordance with another exemplary embodiment, an automotive vehicle is provided. The automotive vehicle comprises a body, a drive system, an airdam, and a plurality of protrusions. The body has a centerline, an undercarriage, and a front portion. The drive system is disposed within the body. The airdam is disposed against the front surface. The airdam has an airdam surface. The plurality of protrusions extend from the airdam. The plurality of protrusions are disposed normal to the airdam surface, and are positioned around the centerline for protection of the undercarriage.

In accordance with a further exemplary embodiment, an automotive vehicle is provided. The automotive vehicle comprises a body having a centerline, an undercarriage, and a front portion. The drive system is disposed within the body. The bumper is disposed against the front surface. The bumper has a bumper surface. The plurality of protrusions extend from the bumper. The plurality of protrusions are disposed normal to the bumper surface, and are positioned around the centerline for protection of the undercarriage.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
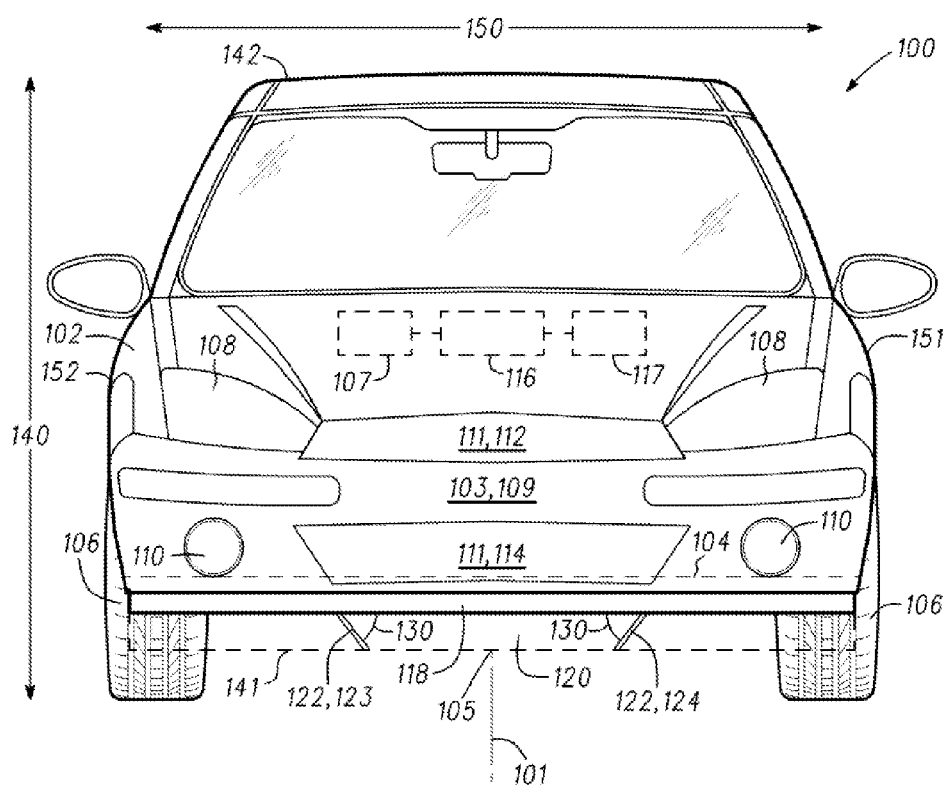
FIG. 1 is a plan view of an automotive vehicle having a front surface that includes protrusions positioned around a center of the automotive vehicle for protection of the automotive vehicle's undercarriage from high velocity air and aerodynamic drag, shown from a view directly in front of the automotive vehicle, in accordance with an exemplary embodiment.

FIG. 1 illustrates an automotive vehicle 100, or automobile, according to an exemplary embodiment. In FIG. 1, the automotive vehicle 100 is shown from a view directly in front of the automotive vehicle 100. The automotive vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

The automotive vehicle 100 includes a body 102 that is arranged on a chassis 104. The body 102 substantially encloses the other components of the automotive vehicle 100. The body 102 and the chassis 104 may jointly form a frame. The body 102 forms, among other regions, a front portion 103 comprising a front surface 109, and an undercarriage 105. The undercarriage 105 of the automotive vehicle 100 is at least partially protected from high velocity air, and resulting aerodynamic resistance, or drag, by protrusions 122 (described further below) that extend from the front surface 109 and are positioned around a centerline 101 of the automotive vehicle 100.

As used herein, the front surface 109 refers to a surface of the front portion 103 of the automotive vehicle body 102 that is facing in a forward direction of travel of the automotive vehicle 100. Also as used herein, the undercarriage 105 refers to a bottom portion of the automotive vehicle 100 formed by the body 102, facing the road, that is disposed beneath the occupancy regions within the automotive vehicle 100 in which a driver and passengers of the automotive vehicle 100 may be seated, and also below a trunk of the automotive vehicle 100, an engine compartment of the automotive vehicle 100, and/or other inner regions within the automotive vehicle 100 in which various other components of the automotive vehicle 100 may be housed.

As depicted in FIG. 1, the automotive vehicle 100 also includes a plurality of wheels 106, a drive system 107, front headlights 108, front fog lights 110, front surface openings 111, a radiator 116, an environmental control system 117, and a front bumper 118, in addition to the above-referenced protrusions 122.

The wheels 106 are each rotationally coupled to the chassis 104 near a respective corner of the body 102 to facilitate movement of the automotive vehicle 100. In a preferred embodiment, the automotive vehicle 100 includes four wheels, although this may vary in other embodiments (for example for trucks and certain other automotive vehicles).

The drive system 107 is mounted on the chassis 104, and drives the wheels 106. The drive system 107 preferably comprises a propulsion system. In certain exemplary embodiments, the drive system 107 comprises a combustion engine and/or an electric motor/generator, coupled with a transmission thereof. In certain embodiments, the drive system 107 may vary, and/or two or more drive systems 107 may be used. By way of example, the automotive vehicle 100 may also incorporate any one of, or combination of, a number of different types of electrical propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

The front surface openings 111 are formed in the front surface 109 of the automotive vehicle 100. In the depicted embodiment, the front surface openings 111 include an upper front opening 112 and a lower front opening 114. The upper front opening 112 comprises an upper grille, and the lower front opening 114 comprises a lower grille. The number of openings 111 and/or their configuration may vary in other embodiments. For example, in one exemplary embodiment, the automotive vehicle 100 may include a single front grille. In another exemplary embodiment, the automotive vehicle 100 may include three or more front grilles.

The radiator 116 receives air from outside the automotive vehicle 100 via the opening(s) 111. In a preferred embodiment, the radiator 116 is connected to the frame at an outer portion thereof and, although not illustrated in detail, includes multiple cooling channels therein that contain a cooling fluid (i.e., coolant) such as water and/or ethylene glycol (i.e., "antifreeze"), and is coupled to the drive system 107 and the environmental control system 117.

The environmental control system 117 is coupled to the radiator 116, and uses the outside air for cooling the automotive vehicle 100. In a preferred embodiment, the environmental control system 117 comprises an air conditioning system for the automotive vehicle 100. The outside air may also be used for cooling the drive system 107 and/or components thereof (such as a combustion engine) and/or other components of the automotive vehicle 100.

The front bumper 118 is disposed against the front surface 109 of the automotive vehicle 100 in a lower region of the front surface 109. In a preferred embodiment, the front bumper 118 is made of a plastic material. The front bumper 118 is preferably attached to the front surface 109 via an adhesive material during manufacturing of the automotive vehicle 100.

In certain embodiments, an airdam 120 is disposed against the front surface 109. The airdam 120 is depicted in phantom in FIG. 1. In a preferred embodiment, the airdam 120 is also made of a plastic material. In certain embodiments, the airdam 120 may comprise a metallic material. The airdam 120, if utilized, is preferably positioned directly below the front bumper 118. The airdam 120 helps to provide protection for the undercarriage 105 from high velocity air underneath the automotive vehicle 100 during operation of the automotive vehicle 100.

The automotive vehicle 100 also includes the above-referenced protrusions 122. In the depicted embodiment, the automotive vehicle 100 includes a first protrusion 123 and a second protrusion 124, both extending from the front surface 109. In certain embodiments, three or more such protrusions 122 may be used. The protrusions 122 are positioned around a centerline 101 of the automotive vehicle 100 (which also comprises a centerline of the body 102), and are preferably equidistant from the centerline 101. The protrusions 122 extend generally outward from the front surface 109. The protrusions 122 provide further protection for the undercarriage 105, particularly proximate the centerline 101, from high velocity air underneath the automotive vehicle 100 during operation thereof. The protrusions 122 create a vortex underneath the undercarriage 105 (particularly, underneath a center portion thereof proximate the centerline 101) that pushes air further below underneath the undercarriage 105 and the automotive vehicle 100. Preferably, each protrusion 122 is rectangular in shape. However, in certain embodiments other shapes may be used, such as triangle-shaped protrusions 122.

The placement of the protrusions 122 can be referenced geometrically with respect to a first dimension 140 and a second dimension 150. The first dimension 140 extends front to back along the automotive vehicle 100, from a front portion 141 of the automotive vehicle 100 to a rear portion 142 of the automotive vehicle 100. In the depicted embodiment, with respect to the first dimension 140, the protrusions 122 each extend in the forward direction of travel of the automotive vehicle 100. Specifically, the protrusions 122 are preferably normal (or perpendicular) to the front surface 109 with respect to the first dimension 140.

The second dimension 150 extends right to left, from a driver's side 151 to a passenger's side 152 of the automotive vehicle 100. In the depicted embodiment, with respect to the second dimension 150, the protrusions 122 each extend at an angle 130 with respect to the front surface 109. Specifically, the first protrusion 123 forms an angle 130 with respect to the front surface 109 toward the centerline 101 of the automotive vehicle 100, while the second protrusion 124 preferably forms an identical angle 130 with respect to the front surface 109 toward the centerline 101. In one preferred embodiment, the angle 130 is equal to forty-five degrees. Accordingly, in this embodiment, the protrusions 122 each form an angle of forty-five degrees with respect to the front surface 109 in the second dimension 150 toward the other protrusion 122 and toward the centerline 101. Also in this embodiment, each protrusion 122 can also be considered to form an angle of forty-five degrees with the centerline 101 in the second dimension 150.

Depending on the embodiment, the protrusions 122 may extend from the airdam 120 (as described directly below in connection with the embodiment of FIG. 2) or, alternatively, from the bumper 118 (as described further below in connection with the embodiment of FIG. 3) of the front surface 109. In either case, the protrusions 122 provide protection for the undercarriage 105 from high velocity air underneath the automotive vehicle 100 during operation of the automotive vehicle 100.

Figure 2:
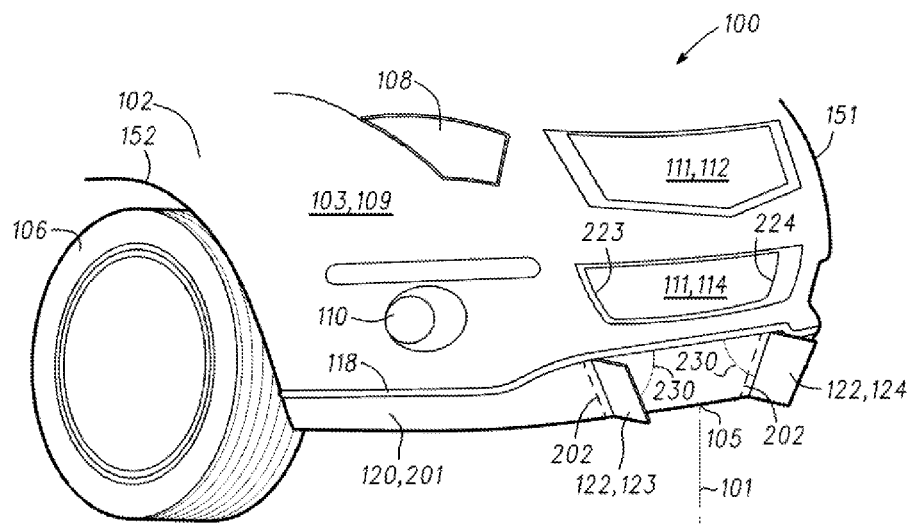
FIG. 2 is a close-up, plan view of a portion of the automotive vehicle of FIG. 1, including an airdam and a plurality of protrusions extending from the airdam and positioned around a center of the automotive vehicle for protection of the automotive vehicle's undercarriage from high velocity air and aerodynamic drag, shown from an off-center, angled front view, in accordance with an exemplary embodiment.

Specifically, FIG. 2 is a close-up, plan view of a portion of the automotive vehicle 100 of FIG. 1, in accordance with an embodiment in which the automotive vehicle 100 includes an airdam 120. The airdam 120 is disposed against the front surface 109 of the automotive vehicle 100. In one such embodiment, the airdam 120 is molded into the front surface 109 during manufacturing of the automotive vehicle 100. In another such embodiment, the airdam 120 comprises a separate piece that is fastened (for example, via screws) to the front surface 109 during manufacturing of the automotive vehicle 100. As depicted in FIG. 2, the airdam 120 has an airdam surface 201 facing outward and away from the automotive vehicle 100.

In the embodiment of FIG. 2, the protrusions 122 extend generally outward from the airdam surface 201. Each of the protrusions 122 is preferably normal, or perpendicular, to the airdam surface 201 with respect to the first dimension 140 of FIG. 1. In addition, with respect to the second dimension 150 of FIG. 1, the protrusions 122 each extend at an angle 230 with respect to the airdam surface 201. Specifically, the first protrusion 123 forms an angle 230 with respect to the airdam surface 201 toward the centerline 101 of the automotive vehicle 100, while the second protrusion 124 preferably forms an identical angle 230 with respect to the airdam surface 201 toward the centerline 101.

In one preferred embodiment, the angle 230 is equal to forty-five degrees. Accordingly, in this embodiment, the protrusions 122 each form an angle of forty-five degrees with respect to the airdam surface 201 in the second dimension 150 toward the other protrusion 122 and toward the centerline 101. Also in this embodiment, each protrusion 122 can also be considered to form an angle of forty-five degrees with the centerline 101 in the second dimension 150.

Also in the embodiment of FIG. 2, the protrusions 122 preferably comprise the same material (or a similar material) as the airdam 120. In one such example, the protrusions 122 comprise a plastic material. In another such exemplar, the protrusions 122 comprise a metallic material.

In addition, in one example, a base 202 (depicted in phantom in FIG. 2) is provided for each of the protrusions 122. Specifically, in one example of the embodiment of FIG. 2, the base 202 for each protrusion 122 is positioned between the respective protrusion 122 and the airdam surface 201. The bases 202 can be used as a mounting platform for mounting the protrusions 122 against the airdam 120, for example via a screw assembly (not depicted). The bases 202 are preferably made from the same material as the protrusions 122, most preferably from a plastic or metal material. In certain embodiments, bases 202 are not needed for the protrusions 122. For example, in certain embodiments, the protrusions 122 may be molded as part of the airdam 120 as a single, integral piece with the airdam 120.

In one example of the embodiment of FIG. 2, each protrusion 122 has a length of approximately three to four inches (extending from the airdam surface 201 away from the automotive vehicle 100), a width of approximately two inches, and a depth of approximately one-eighth of an inch. Each base 202 preferably has a length of approximately one inch (extending from the airdam surface 201 away from the automotive vehicle 100), a width of approximately one inch, and a depth of approximately one-eighth of an inch.

Figure 3:
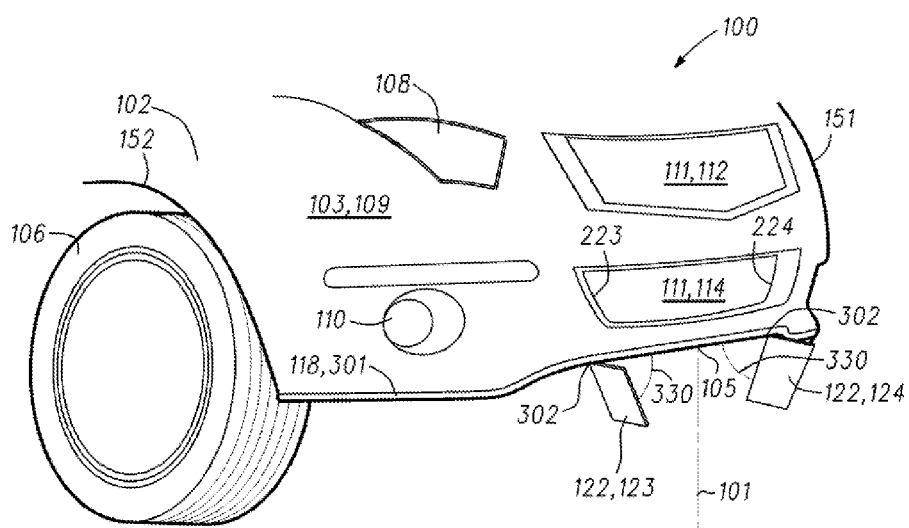
FIG. 3 is a close-up, plan view of a portion of the automotive vehicle of FIG. 1, including a front bumper and a plurality of protrusions extending from the front bumper and positioned around a center of the automotive vehicle for protection of the automotive vehicle's undercarriage from high velocity air and aerodynamic drag, shown from an off-center, angled front view, in accordance with another exemplary embodiment.

With reference to FIG. 3, a close-up, plan view is provided of a portion of the automotive vehicle 100 of FIG. 1, in accordance with an alternate embodiment in which the automotive vehicle 100 does not include an airdam. In the embodiment of FIG. 3, the bumper 118 of FIG. 1 includes a bumper surface 301 facing outward and away from the automotive vehicle 100. The protrusions 122 extend generally outward from the bumper surface 301. Each of the protrusions 122 is preferably normal, or perpendicular, to the bumper surface 301 with respect to the first dimension 140 of FIG. 1. In addition, with respect to the second dimension 150 of FIG. 1, the protrusions 122 each extend at an angle 330 with respect to the bumper surface 301

Specifically, the first protrusion 123 forms an angle 330 with respect to the bumper surface 301 toward the centerline 101 of the automotive vehicle 100, while the second protrusion 124 preferably forms an identical angle 330 with respect to the bumper surface 301 toward the centerline 101. In one preferred embodiment, the angle 330 is equal to forty-five degrees. Accordingly, in this embodiment, the protrusions 122 each form an angle of forty-five degrees with respect to the bumper surface 301 in the second dimension 150 toward the other protrusion 122 and toward the centerline 101. Also in this embodiment, each protrusion 122 can also be considered to form an angle of forty-five degrees with the centerline 101 in the second dimension 150.

Also in the embodiment of FIG. 3, the protrusions 122 preferably comprise the same material as the bumper 118, most preferably a plastic material, but may also comprise a metallic material. In addition, in one example, a base 302 (depicted in phantom in FIG. 3) is provided for each of the protrusions 122. Specifically, in this example, a base 302 is positioned between each protrusion 122 and the bumper 118. Each base 302 can be used as a mounting platform for mounting a respective protrusion 122 against the bumper 118, for example via a screw assembly (not depicted). The bases 202 are preferably made from the same material as the protrusions 122, most preferably from a plastic or metal material. In certain embodiments, bases 202 are not needed for the protrusions 122. For example, in certain embodiments, the protrusions 122 may be molded as part of the bumper 118 as a single, integral piece.

In one example of the embodiment of FIG. 3, each protrusion 122 has a length of approximately three to four inches (extending from the bumper surface 301 away from the automotive vehicle 100), a width of approximately two inches, and a depth of approximately one-eighth of an inch. Each base 302 preferably has a length of approximately one inch (extending from the bumper surface 301 away from the automotive vehicle 100), a width of approximately one inch, and a depth of approximately one-eighth of an inch.

With respect to either the embodiments of FIG. 2 or 3, the protrusions 122 are positioned an equal distance about the centerline 101 and in proximity to the lower opening 114 (or lower grille). Specifically, the first protrusion 123 is preferably disposed below and just beyond or outside (i.e., slightly closer to the passenger's side 152 than) a first outer edge 223 of the lower opening 111. Similarly, the second protrusion 124 is preferably disposed below and just beyond or outside (i.e., slightly closer to the driver's side 151 than) a second outer edge 224 of the lower opening 111.

The protrusions 122 of FIGS. 1-3 provide for potentially improved protection for the undercarriage 105 of the automotive vehicle 100 from high velocity air during operation of the automotive vehicle 100. For example, as high velocity air approaches the centerline 101 (which typically would serve as a stagnation point for air underneath the automotive vehicle 100), the placement of the protrusions 122 in FIGS. 1-3 causes the flow of the high velocity air to move further underneath the automotive vehicle 100, as compared to if the protrusions 122 were not present. This results in decreased aerodynamic resistance, or drag, for the automotive vehicle 100, and therefore can improve fuel economy. In addition, the placement of the protrusions 122 can provide for increased air pressure around one or more of the openings 111 (particularly the lower opening or grille 114), which in turn may result in increased air flow for the radiator 116 of the automotive vehicle 100. The increased air flow to the radiator 116 may result in improved performance of the environmental control system 117 as well as further improved fuel efficiency for the automotive vehicle 100.

Accordingly, improved vehicles are provided. The disclosed vehicles include protrusions that extend from a front surface of the automotive vehicle and that are positioned around a center portion of the automotive vehicle in a manner that helps to protect the undercarriage of the automotive vehicle from high velocity air. This in turn can help to reduce aerodynamic resistance, or drag, for the automotive vehicle, and may further help to improve performance of an environmental control system for the automotive vehicle as well improve fuel economy for the automotive vehicle. It will be appreciated that the disclosed automotive vehicles and/or components thereof may vary from those depicted in the Figures and described herein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. An automotive vehicle comprising:
   a body having a driver's side, a passenger's side, and a centerline that extends from the front to the rear of the vehicle and is equidistant between the driver's side and the passenger's side, an undercarriage, and a front portion having a front surface;
   a drive system disposed within the body; and
   a plurality of protrusions extending from the front portion, the plurality of protrusions positioned around the centerline for protection of the undercarriage, wherein each of the plurality of protrusions comprises an inner portion extending from the front surface at a non-zero inner angle with respect to the front surface toward the centerline and an outer portion extending from the front surface at a non-zero outer angle with respect to the front surface toward the centerline;
   wherein each protrusion comprises a deflector plate having two sides exposed to outside air and that shields the undercarriage from high velocity, outside air.

2. The automotive vehicle of claim 1, wherein the plurality of protrusions are configured to create a vortex for air underneath the undercarriage.

3. The automotive vehicle of claim 1, wherein:
   each of the plurality of protrusions forms an approximately forty-five degree angle with respect to the front surface toward the centerline as the protrusion extends from the front surface.

4. The automotive vehicle of claim 1, further comprising:
   an airdam disposed against the front portion;
   wherein the plurality of protrusions extend from the airdam.

5. The automotive vehicle of claim 1, further comprising:
   a bumper disposed against the front portion;
   wherein the plurality of protrusions extend from the bumper.

6. The automotive vehicle of claim 1, wherein the plurality of protrusions comprises:
   a first protrusion disposed on a first side of the centerline and a first distance from the centerline; and
   a second protrusion disposed on a second side of the centerline and a second distance from the centerline, the second distance being approximately equal to the first distance.

7. The automotive vehicle of claim 1, further comprising:
   a radiator;
   wherein:
      the front portion of the body forms a grille therein, the grille comprising an opening, coupled to the radiator, for outside air to enter the automotive vehicle to the radiator, the opening bounded by a first outer edge toward a driver's side of the automotive vehicle and a second outer edge proximate a passenger's side of the automotive vehicle; and
      the plurality of protrusions comprises:
         a first protrusion disposed proximate the first outer edge; and
         a second protrusion disposed proximate the second outer edge.

8. An automotive vehicle comprising:
   a body having a driver's side, a passenger's side, and a centerline that extends from the front to the rear of the vehicle and is equidistant between the driver's side and the passenger's side, an undercarriage, and a front portion;
   a drive system disposed within the body;
   an airdam disposed against the front portion, the airdam having an airdam surface; and
   a plurality of protrusions extending from the airdam, the plurality of protrusions positioned around the centerline for protection of the undercarriage, wherein each of the plurality of protrusions comprises an inner portion extending from the airdam surface at a non-zero inner angle with respect to the airdam surface toward the centerline and an outer portion extending from the airdam surface at a non-zero outer angle with respect to the airdam surface toward the centerline;
   wherein each protrusion comprises a deflector plate having two sides exposed to outside air and that shields one of the front tires the undercarriage from high velocity, outside air.

9. The automotive vehicle of claim 8, wherein the plurality of protrusions are configured to create a vortex for air underneath the undercarriage.

10. The automotive vehicle of claim 8, wherein each of the plurality of protrusions forms an approximately forty-five degree angle with respect to the airdam surface toward the centerline as the protrusion extends from the airdam surface.

11. The automotive vehicle of claim 8, wherein the plurality of protrusions comprises:
    a first protrusion disposed on a first side of the centerline and a first distance from the centerline; and
    a second protrusion disposed on a second side of the centerline and a second distance from the centerline, the second distance being approximately equal to the first distance.

12. The automotive vehicle of claim 8, further comprising:
    a radiator;
    wherein:
       the front portion of the body forms a grille therein, the grille comprising an opening, coupled to the radiator, for outside air to enter the automotive vehicle to the radiator, the opening bounded by a first outer edge toward a driver's side of the automotive vehicle and a second outer edge proximate a passenger's side of the automotive vehicle; and the plurality of protrusions comprises:
a first protrusion disposed proximate the first outer edge; and
a second protrusion disposed proximate the second outer edge.

13. An automotive vehicle comprising:
a body having a driver's side, a passenger's side, and a centerline that extends from the front to the rear of the vehicle and is equidistant between the driver's side and the passenger's side, an undercarriage, and a front portion;
a drive system disposed within the body;
a bumper disposed against the front portion, the bumper having a bumper surface; and
a plurality of protrusions extending from the bumper, the plurality of protrusions positioned around the centerline for protection of the undercarriage, wherein each of the plurality of protrusions comprises an inner portion extending from the bumper surface at a non-zero inner angle with respect to the bumper surface toward the centerline and an outer portion extending from the bumper surface at a non-zero outer angle with respect to the bumper surface toward the centerline;
wherein each protrusion comprises a deflector plate having two sides exposed to outside air and that shields the undercarriage from high velocity, outside air.

14. The automotive vehicle of claim 13, wherein the plurality of protrusions are configured to create a vortex for air underneath the undercarriage.

15. The automotive vehicle of claim 13, wherein the plurality of protrusions comprises:
a first protrusion disposed on a first side of the centerline and a first distance from the centerline; and
a second protrusion disposed on a second side of the centerline and a second distance from the centerline, the second distance being approximately equal to the first distance.

16. The automotive vehicle of claim 13, further comprising:
a radiator;
wherein:
the front portion of the body forms a grille therein, the grille comprising an opening, coupled to the radiator, for outside air to enter the automotive vehicle to the radiator, the opening bounded by a first outer edge toward a driver's side of the automotive vehicle and a second outer edge proximate a passenger's side of the automotive vehicle; and
the plurality of protrusions comprises:
a first protrusion disposed proximate and below the first outer edge; and
a second protrusion disposed proximate and below the second outer edge.

17. The automotive vehicle of claim 1, wherein each of the plurality of protrusions comprises a planar member that extends at an initial, positive, non-zero angle away from the centerline as the planar member extends from the front surface.

18. The automotive vehicle of claim 1, wherein the inner and outer angles are equal to one another.

19. The automotive vehicle of claim 7, wherein:
the first protrusion is disposed to the driver's side of the first outer edge; and
the second protrusion is disposed to the passenger's side of the second outer edge.

20. The automotive vehicle of claim 19, wherein:
the first protrusion is disposed below and to the driver's side of the first outer edge; and
the second protrusion is disposed below and to the passenger's side of the second outer edge.

* * * * *